T. McCORMICK.
BRAKE FOR PLEASURE RAILWAYS.
APPLICATION FILED MAY 8, 1913.
1,137,342.
Patented Apr. 27, 1915.
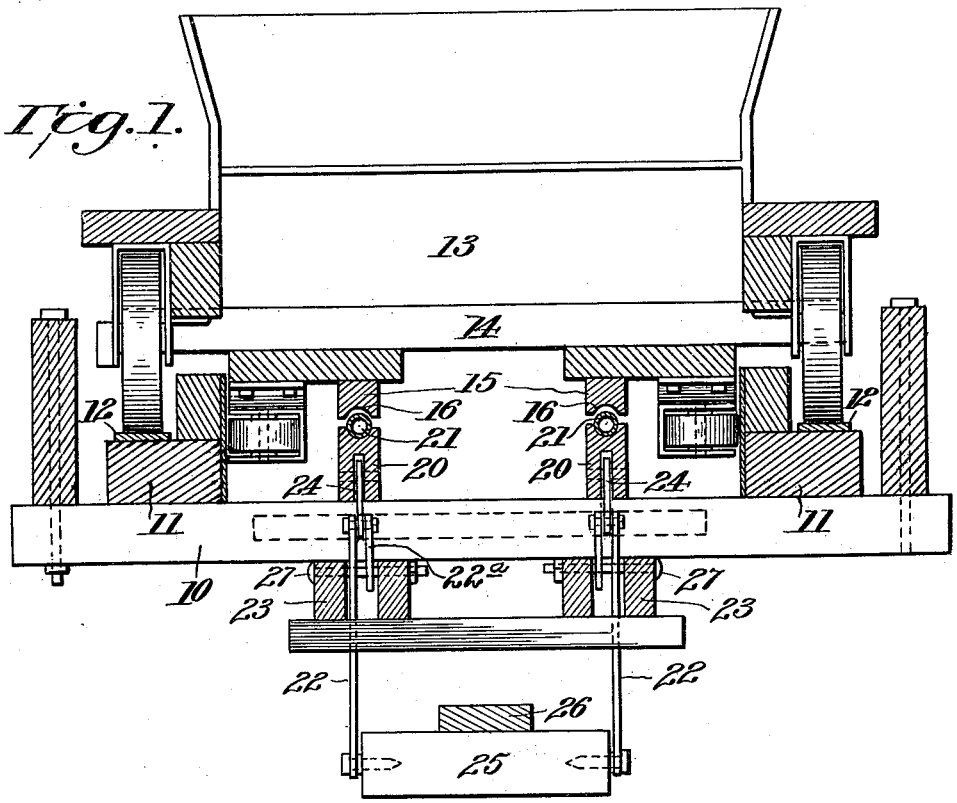
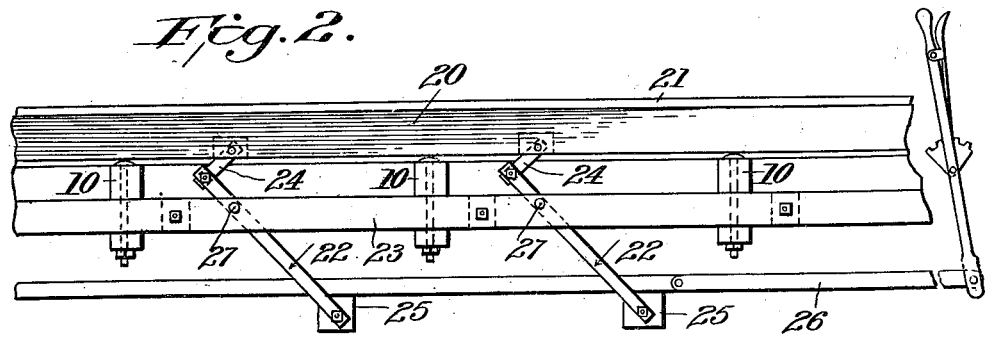
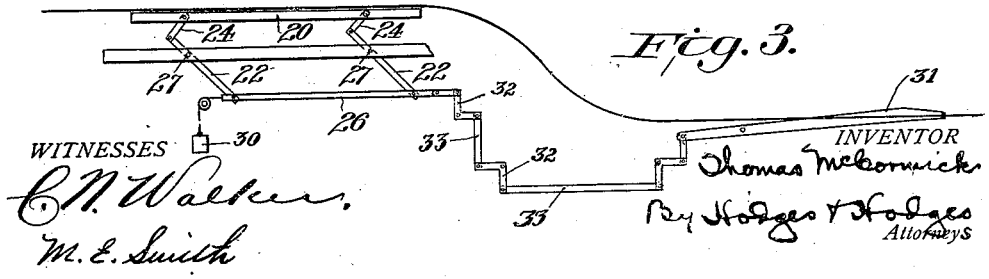
WITNESSES
C. N. Walker
M. E. Smith
INVENTOR
Thomas McCormick
By Hodges & Hodges
Attorneys

UNITED STATES PATENT OFFICE.

THOMAS McCORMICK, OF DETROIT, MICHIGAN, ASSIGNOR TO HIMSELF AND FREDERICK INGERSOLL, OF DETROIT, MICHIGAN.

BRAKE FOR PLEASURE-RAILWAYS.

1,137,342.     Specification of Letters Patent.    Patented Apr. 27, 1915.

Application filed May 8, 1913. Serial No. 766,439.

*To all whom it may concern:*

Be it known that I, THOMAS MCCORMICK, a citizen of the United States, residing at Detroit, in the county of Wayne and State of Michigan, have invented new and useful Improvements in Brakes for Pleasure-Railways, of which the following is a specification.

This invention relates to an improved brake for pleasure railways.

Owing to the high speed of travel of the cars or other vehicles employed on pleasure railways, it is imperative that efficient and reliable means be provided to arrest the movement of the vehicle in case of accident, and also to diminish the speed of travel when the car approaches the end of its trip.

One of the objects of the present invention is to provide a brake of simple construction which will quickly check the momentum of a car or similar vehicle without shock to the occupants.

A further object is to provide the track and each car with complemental coacting brake members and means for effecting an engagement of the said complemental parts.

A further object is to provide improved actuating mechanism for the movable brake member.

The invention will be hereinafter fully set forth and particularly pointed out in the claims.

In the accompanying drawing:—Figure 1 is a transverse sectional view illustrating a track structure and a car thereon, provided with my improved brake. Fig. 2 is a side elevation illustrating the movable brake member and its actuating mechanism. Fig. 3 is a diagrammatic view illustrating means for automatically operating my improved brake.

Referring to the drawings, the cross ties 10 are supported upon a suitable structure and in turn support the beams 11 to which the rails 12 are secured in any suitable or preferred manner. The car 13 may be of any preferred type and will not be described in detail. To the floor 14, or at any other suitable point are secured castings 15 the under faces of which are concaved at 16, as clearly illustrated in Fig. 1.

The track member of the brake comprises spaced apart bars 20 arranged longitudinally between the rails and each supporting a pipe or tube 21 adapted to enter and engage the concaved surfaces 16 of the castings 15, said castings corresponding in number with said bars. Said bars normally rest upon the ties, but are raised by means of toggles each formed of a long arm 22 pivoted to a beam 23 suspended from the cross ties 10, and a short member 24 connecting the member 22 with the bar 20. The long arms 22 of the toggles are connected at their lower ends with blocks 25 which are in turn connected by an operating member 26 leading to any suitable point for convenient manipulation. In order to provide for the free operation of the toggles, the long arms 22 thereof are supported by pivot bolts 27, and the short arm of each toggle is pivotally mounted between the upper end of the arm 22 and the corresponding end of a supplemental arm 22ª pivoted at its lower end to the bolt 27. In this manner the pivot bolts that connect the ends of the toggles are supported at their ends and binding of the parts is prevented.

In practice when it is desired to arrest the movement of a car the operating member 26 is moved to the left as viewed in Fig. 2 which tends to straighten the toggles, endwise movement of the bars 20 being prevented in suitable manner. As the car approaches the location of the bars 20 the concaved faces of the castings 15 engage the pipes or tubes 21, and the momentum of the car is more or less quickly diminished, depending upon the distance that the operating member 26 has been moved. It is obvious that a movement of the operating member 26 in the other direction will disengage the brake members.

In Fig. 3 I have illustrated a slight modification in which the member 26 is held in a normally inoperative position by suitable means, such as a weight 30. Pivotally supported between the rails adjacent the bottom of a "dip" in the railway, is an operating dog 31, connected by suitable operating levers 32 and links 33 with the member 26. If a car, after passing down the incline should become stalled, the castings 15 thereon will engage the wedge-like end of dog 31, shifting the levers 32 and links 33 in such a manner as to overcome the power of weight 30, causing the brake members 20, 21, to be elevated. Thus, the travel of the next car is immediately arrested as soon as it reaches the brake, thereby providing an efficient safety appliance.

Having thus explained the nature of my invention and described an operative manner of constructing and using the same, although without attempting to set forth all of the forms in which it may be made, or all of the forms of its use, what I claim is:—

1. A brake for pleasure railways comprising a brake member carried by a car, a second brake member located between the rails, one of said members being provided in one face with a longitudinally disposed concaved recess, the other being provided in one face with a longitudinally disposed complemental tubular element adapted to enter said recess, and means for moving one of said members to bring the tubular element of one member into and out of engagement with the groove of the other member.

2. A brake for pleasure railways comprising a brake member carried by a car and provided in one face with a longitudinally disposed concaved recess, a second brake member located between the rails and provided in one face with a longitudinally disposed complemental tubular element adapted to enter said recess, and means for raising and lowering said last mentioned brake member to bring said tubular element into and out of engagement with the groove of the other member.

3. As an improvement in brakes for pleasure railways, the combination with cross ties and rails supported thereby, of a brake member normally resting upon said ties, a supporting beam suspended from said ties, toggles supported by said beam and engaging said brake member, and means for operating said toggles.

4. As an improvement in brakes for pleasure railways, the combination with cross ties and rails supported thereby, of a brake member normally resting upon said ties, supporting beams suspended from said ties, long toggle members pivoted to said beams, short toggle members connecting said long toggle members and said brake member, and an operating member connecting the lower ends of said long toggle members.

5. As an improvement in brakes for pleasure railways, the combination with cross ties and rails supported thereby, of a brake member normally resting upon said ties, a supporting beam suspended from said ties, pivot pins carried by said beams, long toggle members supported by said pivot pins, supplemental toggle members also supported by said pivot pins, short toggle members connecting said long toggle members and said supplemental toggle members with said brake member, and means for moving all of said toggle members in unison.

6. A brake for pleasure railways comprising a track brake member, means for rendering the same normally inoperative, a car brake member adapted to coöperate with said track brake member, and an operating dog for said track brake member arranged to be operated by said car brake member.

7. A brake for pleasure railways comprising a track brake member, a weight for holding the same in normally inoperative position, a car brake member adapted to coöperate with said track brake member, and an operating dog for overcoming the power of said weight and arranged to be operated by said car brake member.

8. A brake for pleasure railways comprising a track brake member, means for rendering the same normally inoperative, a car brake member arranged to coöperate with said track brake member, an operating dog supported at a distant point from said track brake member and arranged to be operated by said car brake member, and connections between said dog and said track brake member.

9. The combination with an inclined track, of a track brake member, means for rendering the same normally inoperative, a car brake member arranged to coöperate with said track brake member, an operating dog pivotally supported at a point below the plane of said track brake member and arranged to coöperate with said car brake member, and connections between said dog and said track brake member.

In testimony whereof I have hereunto set my hand in presence of two subscribing witnesses.

THOMAS McCORMICK.

Witnesses:
W. A. SENIOR,
C. R. QUAY.

Copies of this patent may be obtained for five cents each, by addressing the "Commissioner of Patents, Washington, D. C."